Patented Oct. 10, 1922.

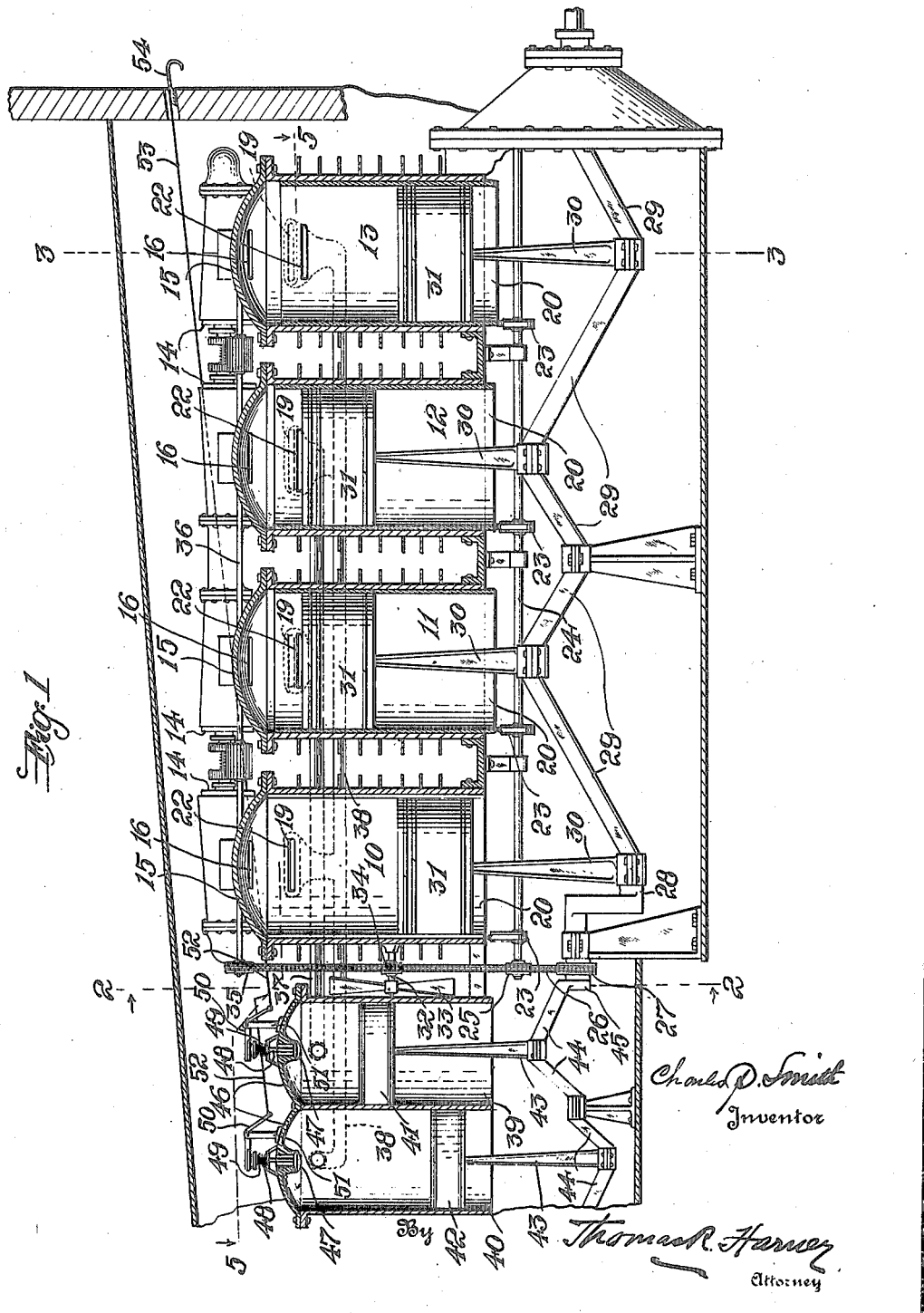

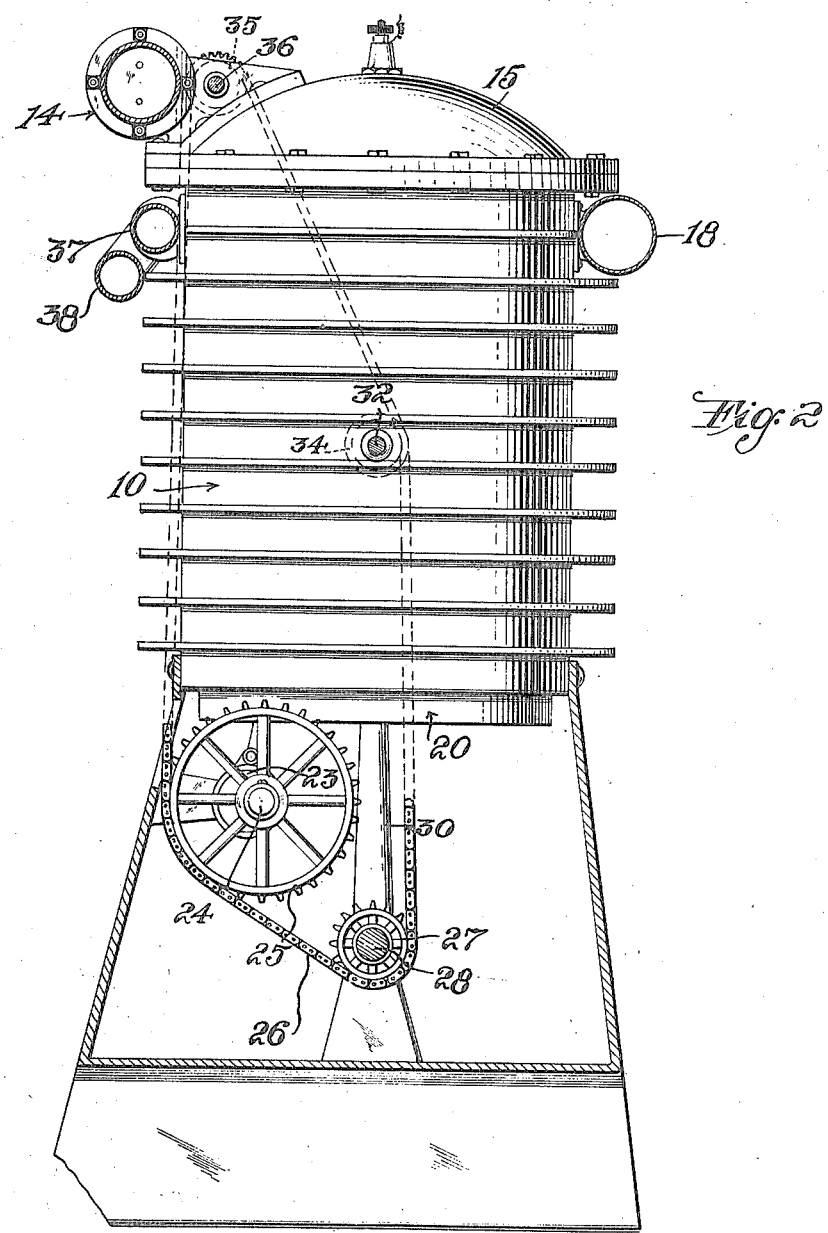

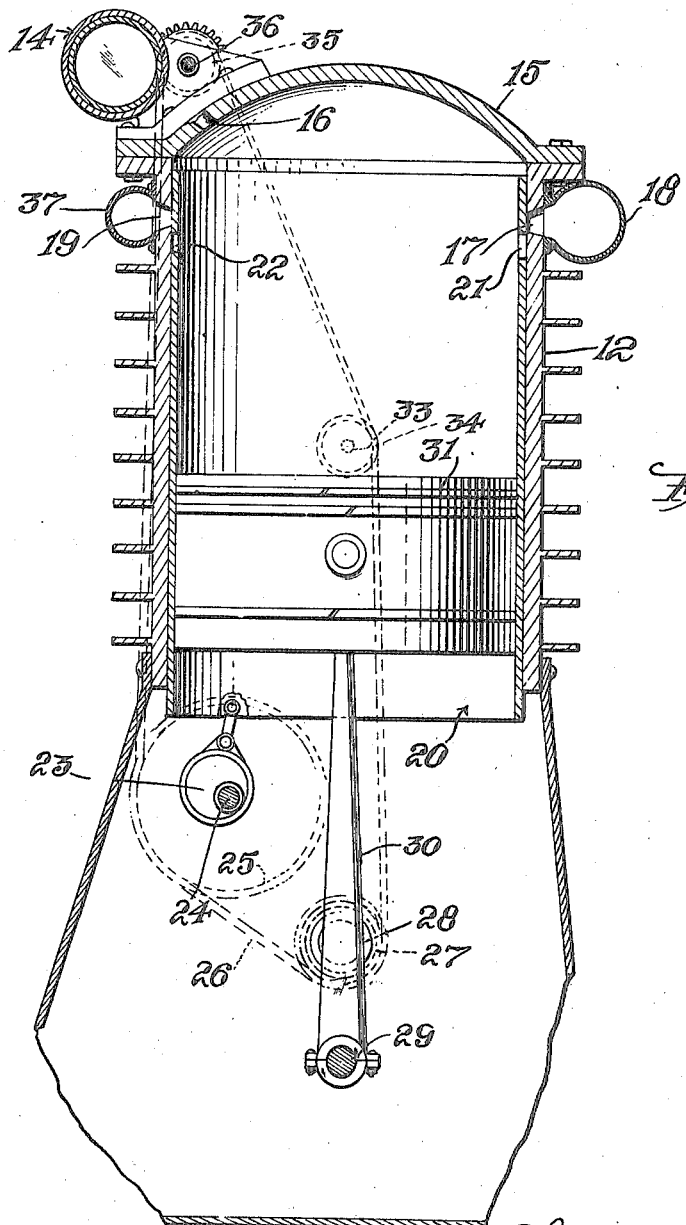

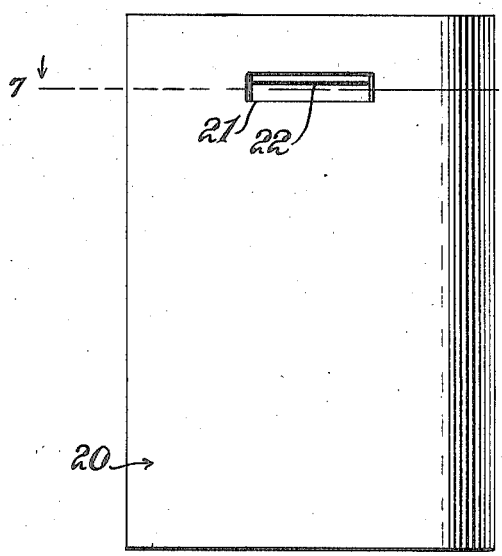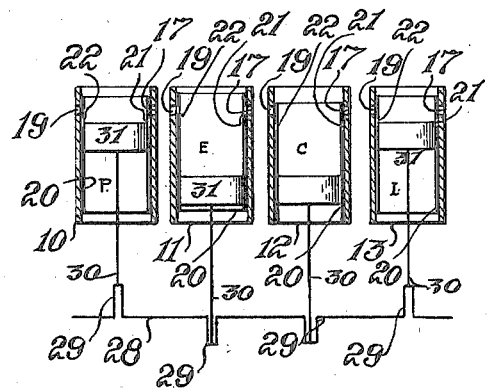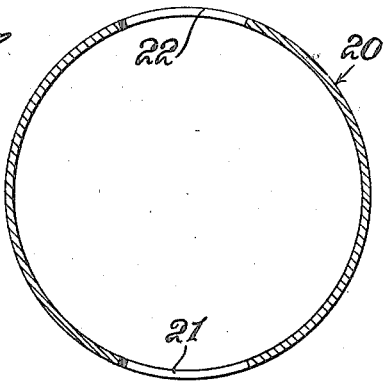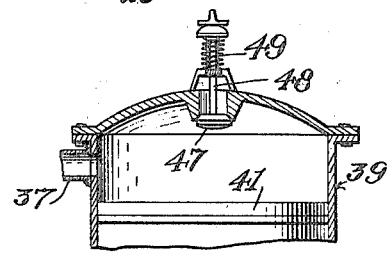

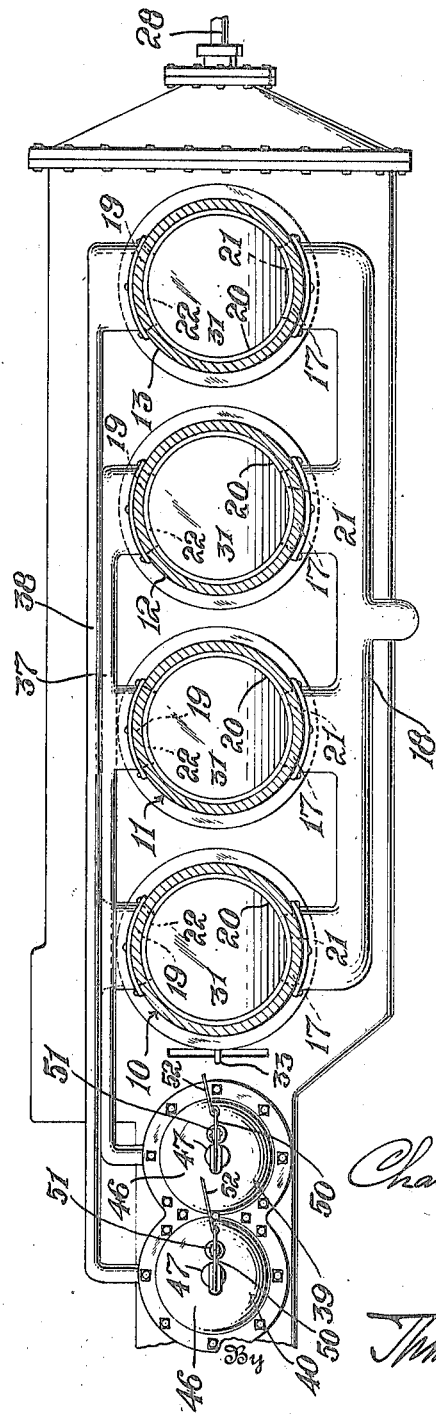

1,431,547

UNITED STATES PATENT OFFICE.

CHARLES P. SMITH, OF WHITE PINE, TENNESSEE, ASSIGNOR OF ONE-THIRD TO BALWIN HARLE, OF MORRISTOWN, TENNESSEE, AND ONE-THIRD TO JOHN G. MOORE, OF WHITE PINE, TENNESSEE.

INTERNAL-COMBUSTION ENGINE.

Application filed July 13, 1920. Serial No. 395,855.

*To all whom it may concern:*

Be it known that I, CHARLES P. SMITH, a citizen of the United States of America, residing at White Pine, in the county of Jefferson and State of Tennessee, have invented certain new and useful Improvements in Internal-Combustion Engines, of which the following is a specification.

My present invention relates generally to internal combustion engines, and more particularly to air cooled engines, my object being the provision of an internal combustion motor including air cooling means applied internally as distinguished from a mere external surface cooling, the nature of which is such that the operation of the motor as a whole will be greatly benefited by virtue of thorough scavenging of the cylinders and expulsion of all of the burned gases.

According to my present invention each cylinder, immediately following the opening of its exhaust port, is subjected to a jet of air under sufficient pressure to thoroughly clean out all of the burned gases and at the same time cool the cylinder and in particular cool its combustion space so as to effectively prevent pre-ignition and in this way avoid overheating.

I also propose an arrangement in connection with which the usual surface radiation of heat can freely take place and in which the intake of each cylinder for the air cooling and scavenging jet is controlled by means which may also be utilized for the control of the exhaust port whereby permanent control of these two ports in properly timed relation is absolutely assured.

In the accompanying drawings which illustrate my invention and form a part of this specification, Figure 1 is a sectional side elevation illustrating the practical application of my invention, Figure 2 is a vertical transverse section taken on line 2—2 of Figure 1, Figure 3 is a vertical transverse section through one of the combustion cylinders taken substantially on line 3—3 of Figure 1, Figure 4 is a partial vertical section through the air supply means, Figure 5 is a horizontal section, Figure 6 is a side view of one of the cylinder valves, Figure 7 is a horizontal section taken on line 7—7 of Figure 6, and Figure 8 is a diagram showing the relation of the cylinder pistons and valves.

Referring now to these figures, I have shown a four cylinder four cycle type of internal combustion motor in which the cylinders 10, 11, 12 and 13 are provided with opposed pairs of intake valves 14 upon the cylinder heads 15 and in communication with the cylinders through intake ports 16 of these cylinder heads, each cylinder being in accordance with my invention provided at one side with an exhaust port 17 communicating with the exhaust manifold 18 and with an air intake port 19 at a point diametrically opposite the exhaust port 17. The exhaust port 17 and the air intake port 19 of each cylinder are controlled by a sleeve valve 20 which slides vertically in the cylinder and has diametrically opposed exhaust and intake apertures 21 and 22, the former of which is set slightly in advance of the latter, that is slightly nearer to the inner end of the sleeve so that in operation the exhaust port 17 will be uncovered slightly in advance of the uncovering of the intake port 19.

Each valve sleeve 20 is actuated by an eccentric 23 on a valve actuating shaft 24 extending along the lower portions of the several cylinders and provided with a sprocket wheel 25 at its forward end engaged by a sprocket chain 26 which also engages a sprocket wheel 27 on the engine or crank shaft 28. This crank shaft has the usual cranks 29 joined by connecting rods 30 with the operating pistons 31 of the engine cylinders which move within the valve sleeves 20 before described.

At its forward end the motor has a fan shaft 32 on which the usual surface radiation fan 33 is mounted, this fan having a sprocket 34 above the sprockets 25 and 27 just above mentioned which is also engaged by the sprocket chain 26, and it will be noted from Figure 2 that the chain 26 may also engage a sprocket 35 on the shaft 36 controlling the gas intake valves 14, which form the subject matter of my Patent No. 1,406,096, dated February 7, 1922.

The sleeve valve controlling shaft 24 is driven at a speed one half of that of the crank shaft 28 and thus during every second revolution of the latter, the sleeve valve 20 of each cylinder comes into upper effective position, its exhaust opening 21 first registering with the exhaust port 17 so that pressure, in the combustion space is relieved slightly in advance of the registering of its air intake opening 22 with the air intake port 19. When the openings of the sleeve valve 20 of each cylinder thus register with their respective ports, air is jetted into and through the combustion space in sufficient volume to thoroughly scavenge out all of the products of the previous explosion and at the same time cool the combustion space to an extent amply sufficient to avoid overheating, in cooperation with the usual surface radiation fan 33, the several combustion cylinders being preferably provided with surface radiation fins as seen in Figure 1.

In accordance with my present improvements I preferably supply air to the several cylinder air intake ports 19 through pipes 37 and 38 from a pair of air compressing cylinders 39 and 40 mounted forwardly of and in line with the series of combustion cylinders and having pistons 41 and 42 as seen in Figure 1 actuated through connecting rods 43 from cranks 44 on a forwardly extending addition 45 of the engine crank shaft 28. Pipe 37 from the compressor cylinder 39 communicates with the air intake ports 19 of cylinders 11 and 12, while pipe 38 leading from the compressor cylinder 40 communicates with the air intake ports of cylinders 10 and 13 so that the two compressor cylinders thus take care of the four combustion cylinders in so far as supply of air at the proper times is concerned, the cranks 44 of the compressor cylinders being slightly angular with respect to the cranks of the shaft 28 actuating the pistons of the combustion cylinders.

The compressor cylinders 39 and 40 are moreover preferably provided in their upper closed heads 46 with air relief valves 47 seated upwardly in seats therein, which open downwardly to permit of the intake of air and which under normal circumstances close upwardly as the respective pistons 41 and 42 move upwardly, the stems 48 of these valves being preferably engaged by closing springs 49, with the upper ends of the valve stems adjacent to and engageable by bell cranks 50 mounted on cylinder head brackets 51 and also engaged by branches 52 of a controlling connection 53 preferably having a manual controlling member 54 for location on the dash of a vehicle as indicated in Figure 1 whereby the operator may by a rearward pull on the connection 53 rock both of the bell cranks 50 and hold the air intake valves of the compressor cylinders against closing when as for instance during starting of a cold motor, it is desired to conserve heat until the motor warms up.

Thus my invention proposes an arrangement in which the troubles of water cooling arrangements and the constant attention required thereby, are avoided, and means utilized in lieu thereof which will effectively operate to prevent overheating and yet enable the motor to maintain a maximum permissible heat at which it is most effective and complete and thorough combustion obtainable, and it is likewise obvious that my invention utilizes means for the above purpose which will thoroughly scavenge the combustion chambers and reduce to a minimum the collection of carbon and the disadvantages thereof.

I claim:

1. An air cooled internal combustion engine having combustion cylinders and air compressor cylinders in line with one another, a common crank shaft for the several combustion and compressor cylinders, pistons in the several cylinders connected to said crank shaft, each of the combustion cylinders having an exhaust port and an air intake opening diametrically opposite the exhaust port, a sleeve valve movable axially in each combustion cylinder having openings to register with the exhaust port and air intake opening, a valve actuating shaft for the several sleeve valves parallel to, and having a geared connection with, the crank shaft, and a pipe connecting each compressor cylinder with the air intake openings of a pair of combustion cylinders.

2. An air cooled internal combustion engine having combustion cylinders and air compressor cylinders in line with one another, a common crank shaft for the several combustion and compressor cylinders, pistons in the several cylinders connected to said crank shaft, each of the combustion cylinders having an exhaust port and an air intake opening diametrically opposite the exhaust port, a sleeve valve movable axially in each combustion cylinder having openings to register with the exhaust port and air intake opening, a valve actuating shaft for the several sleeve valves parallel to, and having a geared connection with, the crank shaft, and a pipe connecting each compressor cylinder with the air intake openings of a pair of combustion cylinders, said sleeve valve of each combustion cylinder being arranged to open the respective exhaust port slightly in advance of uncovering the respective air opening.

In testimony whereof I have affixed my signature.

CHARLES P. SMITH.